US008756496B2

(12) United States Patent
Vedula

(10) Patent No.: US 8,756,496 B2
(45) Date of Patent: Jun. 17, 2014

(54) GENERATING REPORTS IN APPLICATIONS

(75) Inventor: V. N. Ravikiran Vedula, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 1296 days.

(21) Appl. No.: 11/781,275

(22) Filed: Jul. 23, 2007

(65) Prior Publication Data

US 2009/0024913 A1   Jan. 22, 2009

(30) Foreign Application Priority Data

Jul. 20, 2007 (IN) .......................... 1574/CHE/2007

(51) Int. Cl.
*G06F 17/24* (2006.01)

(52) U.S. Cl.
USPC .......................................... 715/255; 715/234

(58) Field of Classification Search
CPC ........................................................ G06F 17/24
USPC ........................................................... 715/255
See application file for complete search history.

(56) References Cited

U.S. PATENT DOCUMENTS

| | | | |
|---|---|---|---|
| 5,778,350 A * | 7/1998 | Adams et al. ................... | 1/1 |
| 5,875,435 A * | 2/1999 | Brown ............................ | 705/30 |
| 7,831,612 B2 * | 11/2010 | Le et al. ......................... | 707/775 |
| 2002/0087378 A1 * | 7/2002 | Como ............................. | 705/8 |
| 2002/0133488 A1 * | 9/2002 | Bellis et al. .................... | 707/6 |
| 2003/0046281 A1 * | 3/2003 | Son ................................ | 707/6 |
| 2003/0212960 A1 * | 11/2003 | Shaughnessy et al. ........ | 715/526 |
| 2004/0215608 A1 * | 10/2004 | Gourlay ......................... | 707/3 |
| 2006/0136387 A1 * | 6/2006 | Yalovsky et al. .............. | 707/3 |
| 2007/0061371 A1 * | 3/2007 | Bodin et al. ................... | 707/200 |
| 2008/0235579 A1 * | 9/2008 | Champion et al. ............ | 715/273 |
| 2010/0268770 A1 * | 10/2010 | Kanasaki ....................... | 709/203 |

OTHER PUBLICATIONS

"HTML GET-HTML Code Tutorial", pp. 1, date: Oct. 11, 2003, URL<http://web.archive.org/web/20130501111446/http://www.htmlcodetutorial.com/forms/_FORM_METHOD_GET.html>.*

* cited by examiner

*Primary Examiner* — Doug Hutton, Jr.
*Assistant Examiner* — Mustafa Amin
(74) *Attorney, Agent, or Firm* — Kilpatrick Townsend & Stockton LLP

(57) ABSTRACT

A method, system and computer program product for generating reports in various applications is provided. The method includes receiving one or more queries and generating one or more reports corresponding to the one or more queries. Thereafter, one or more links corresponding to the one or more reports are provided. One or more forms corresponding to the one or more links are then generated and saved. The saved one or more forms are then dynamically updated based on predetermined criteria.

12 Claims, 4 Drawing Sheets

GENERATING REPORTS IN APPLICATIONS

BACKGROUND

1. Technical Field

Embodiments of the invention relate generally to the field of computer applications and more particularly to a method, system, and computer program product for generating reports in computer applications.

2. Prior Art

Over a period of time, the use of computer applications such as business applications has increased tremendously. Examples of business applications include but are not limited to business intelligence systems, e-business and e-commerce. Business applications and technologies enable organizations to make more informed business decisions. For running a business application a secure database system environment in which different levels of user access to the data can be specified is needed. The database system environment includes a database application and a database, separated into two parts and interconnected by a network. A client part runs the application that accesses data stored in the database and that interacts with a user. A server part runs software providing data access to the database. The client application and server may be run on same or different computers.

Business applications are often used to generate reports that need to be run repeatedly. Examples of reports include but are not limited to production metrics, sales statistics, attendance reports, customer attrition figures, and customer relationship figures. The reports are run on a daily basis to obtain any new data that has been entered into the system. Currently, there are many business applications generating reports based on user requirements. In such instances, the user needs to login to a business application and navigate to the specific pages to run queries or feed data in order to generate reports. However, the reports thus generated are not dynamic in nature. Thus, every time the user logs in, he/she needs to run the same queries or feed the same data again for reports to be generated. Further, these reports require other applications to be installed on the user's device in order to facilitate generation of reports.

In light of the foregoing discussion, there is a need for a method, system, and computer program product for generating reports in business applications that are dynamic in nature. Further, reports that can be generated without the need for installation of applications are needed. Also, when running reports repeatedly, generation of reports with minimal manual intervention should be facilitated.

SUMMARY

An object of the invention is to generate dynamic reports in various applications.

Another object of the invention is to minimize manual intervention when the reports are run repeatedly.

Embodiments of the invention described herein provide a method, system, and computer program product for generating dynamic reports in various applications. In an embodiment of the invention, the method includes providing one or more links corresponding to one or more reports. One or more forms corresponding to the one or more links are then saved. Thereafter, the one or more forms are dynamically updated based on predetermined criteria.

In another embodiment of the invention, a system for generating one or more reports in various applications is provided. The system includes a link module for providing one or more links corresponding to the one or more reports. A saving module then saves one or more forms corresponding to the one or more links. An updating module then dynamically updates the one or more forms based on predetermined criteria.

In yet another embodiment of the invention, a computer program product for generating one or more reports in various applications is provided. The computer program product includes a computer readable program code. The computer readable program code performs providing one or more links corresponding to the one or more reports. One or more forms corresponding to the one or more links are then saved. Thereafter, the one or more forms are dynamically updated based on predetermined criteria.

The one or more forms do not require installation of any other application on one or more users' devices. Manual intervention is also minimized as the one or more users need not run one or more queries again and again once the one or more forms are saved and opened next time.

This summary is not intended to describe each embodiment of the invention. The Detailed description and Figures that follow provide additional aspects of embodiments of the invention.

DETAILED DESCRIPTION OF THE EMBODIMENTS

Various embodiments of the invention provide a method, system, and computer program product for generating dynamic reports in business applications. The method includes receiving one or more queries from one or more devices. One or more users run the one or more queries on the business applications running on the one or more devices. One or more reports are then generated in response to the one or more queries. Thereafter, one or more links corresponding to the one or more reports are provided. One or more forms corresponding to the one or more links are then generated and saved. The saved one or more forms are then dynamically updated based on predetermined criteria.

Figure 1:
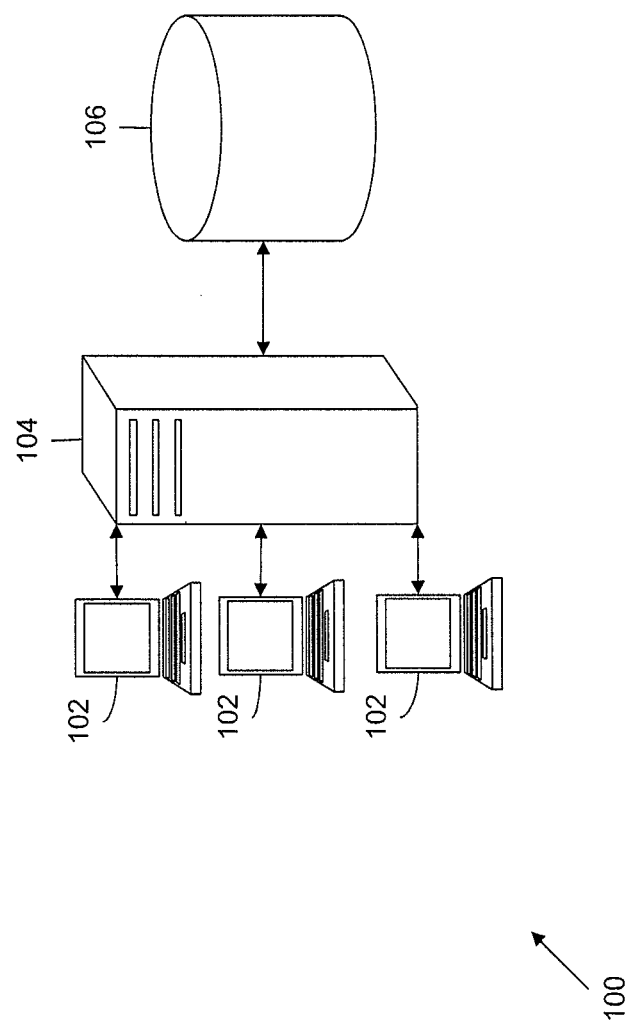
FIG. 1 is a schematic representation of an environment in which various embodiments of the invention may be practiced.

FIG. 1 is a schematic representation of an environment 100 in which various embodiments of the invention may be practiced. Environment 100 includes one or more devices 102, a server 104, and a database 106. One or more devices 102 run various business applications and are connected to server 104. Server 104 runs software providing access to data stored in database 106. Examples of one or more devices 102 include but are not limited to data processing units, computers, laptops, personal digital assistants (PDAs), and cell phones.

Server 104 may be present on one or more devices 102. Business applications running on one or more devices 102 receive one or more queries from one or more users. One or more devices 102 send the one or more queries to server 104. The one or more queries may be sent using structured query language (SQL) statements. Server 104 then provides data to one or more devices 102. Examples of server 104 include but are not limited to application servers and middleware applications. Server 104 may support a data oriented servlet for providing data to one or more devices 102.

Business applications systems include various modules for generating one or more reports once the one or more queries are received from one or more devices 102. The system including these modules has been explained in details in conjunction with FIG. 2.

Figure 2:
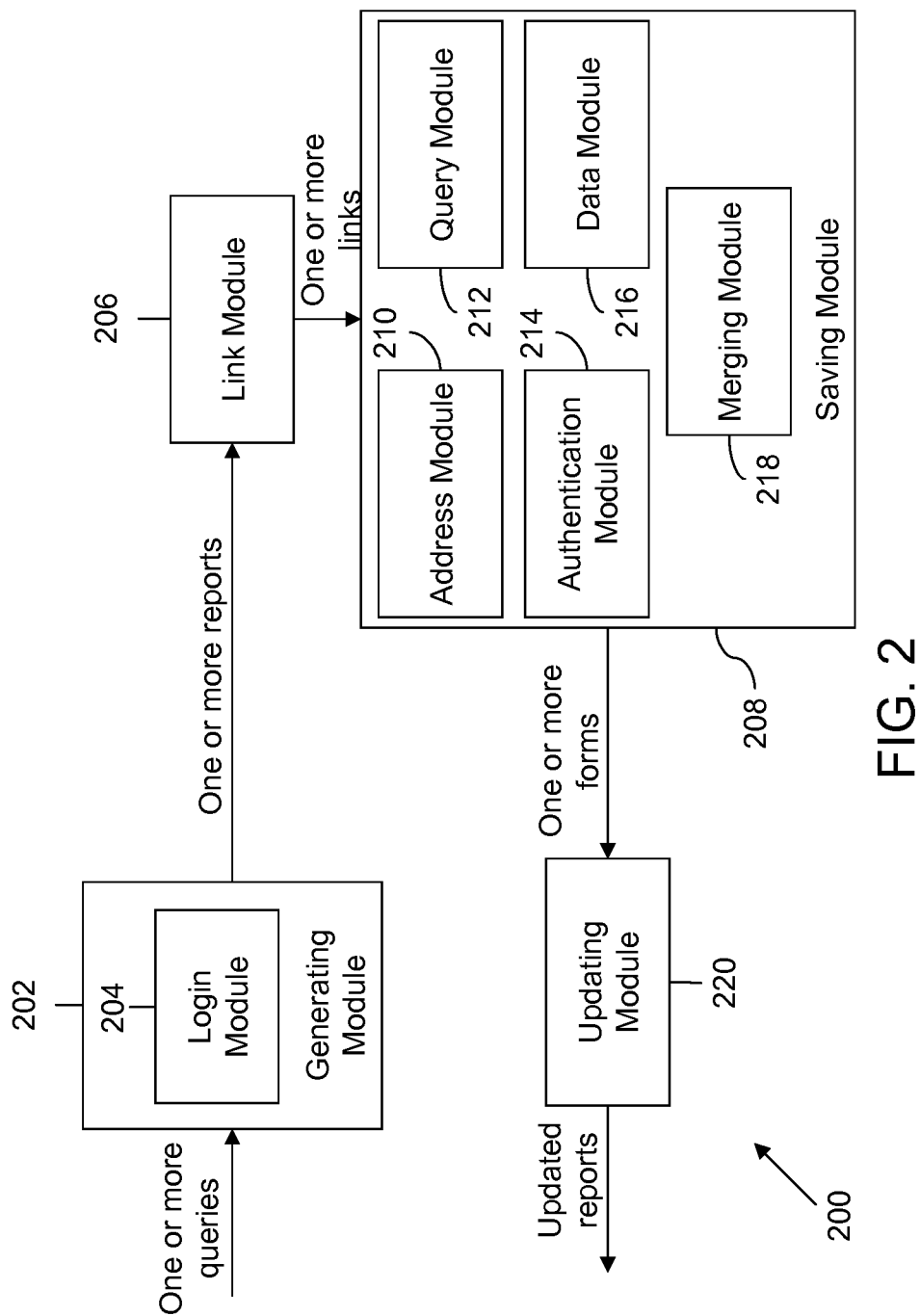
FIG. 2 is a schematic representation of a system for generating dynamic reports in accordance with an embodiment of the invention.

FIG. 2 is a schematic representation of a system 200 for generating dynamic reports in accordance with an embodiment of the invention. System 200 includes a generating module 202, a link module 206, a saving module 208 and an updating module 220. Generating module 202 receives one or more queries from one or more devices 102 and generates one or more reports corresponding to the one or more queries. Link module 206 provides one or more links corresponding to the one or more reports and generates one or more forms when one or more users click on the one or more links. Saving module 208 saves the one or more forms corresponding to the one or more links. Updating module 220 dynamically updates the one or more forms with live data from server 104 based on predetermined criteria to provide dynamically updated reports.

In an embodiment of the invention, generating module 202 may include a login module 204 for validating login details of the one or more users.

In an embodiment of the invention, the one or more links may be download links. In another embodiment of the invention, the one or more links may be a tab in a list of commands.

In an embodiment of the invention, the one or more forms may be in a spreadsheet format. In another embodiment of the invention, the one or more forms may be in an HTML format.

In an embodiment of the invention, saving module 208 may include an address module 210 for saving one or more web addresses corresponding to the one or more forms. In another embodiment of the invention, saving module 208 may include a query module 212 for saving one or more queries corresponding to the one or more reports. In yet another embodiment of the invention, saving module 208 may include an authentication module 214 for saving the login or authentication details of the one or more users. In still another embodiment of the invention, saving module 208 may include a data module 216 for saving metadata or any other data for the one or more forms. In still another embodiment of the invention, saving module 208 may include a merging module 218 for merging the one or more forms based on requirements of the one or more users and some predefined criteria. Merging module 218 may then also save a merged form. The predefined criteria may include types of the one or more forms as one criterion. For example, a form in spreadsheet format may be merged with another form in the spreadsheet format.

System 200 described above may include a greater or a fewer number of modules than those included in FIG. 2. The one or more forms include various details for dynamically updating themselves. The one or more forms have been explained in details in conjunction with FIGS. 3a, 3b and 3c.

Figures 3A, 3B, 3C:
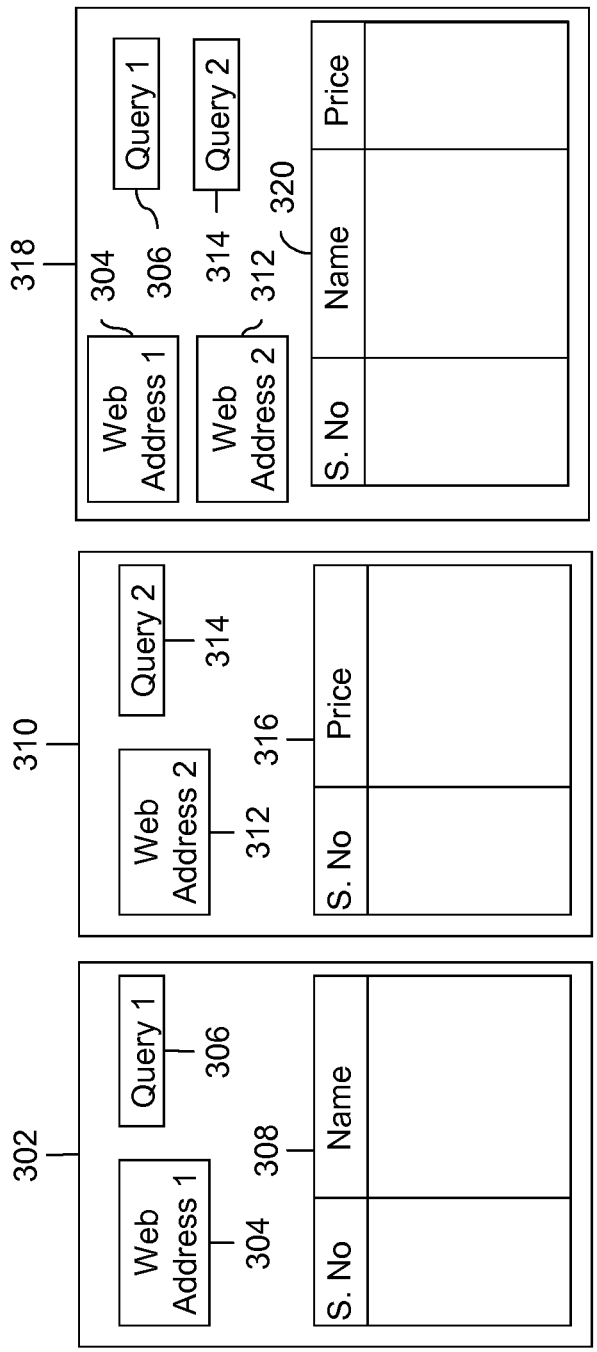
FIGS. 3a, 3b and 3c are exemplary representations of one or more forms in accordance with an embodiment of the invention.

FIGS. 3a, 3b and 3c are exemplary representations of one or more forms in accordance with an embodiment of the invention. FIG. 3a includes a form 302 including a web address 304, a query 306 and data 308. FIG. 3b includes a form 310 including a web address 312, a query 314 and data 316. FIG. 3c includes a merged form 318 including web address 304, query 306, web address 312, query 314 and a merged data 320. In an embodiment of the invention, web address 304 and web address 312 may be same.

Examples of web address 304 and web address 312 include but are not limited to logic links, addresses of servers, addresses of websites and uniform resource locators (URLs). Examples of query 306 and query 314 include but are not limited to key word based searches, customer related data searches, and report searches. Examples of data 308, data 316 and merged data 320 include but are not limited to metadata and other forms of data.

Figure 4:
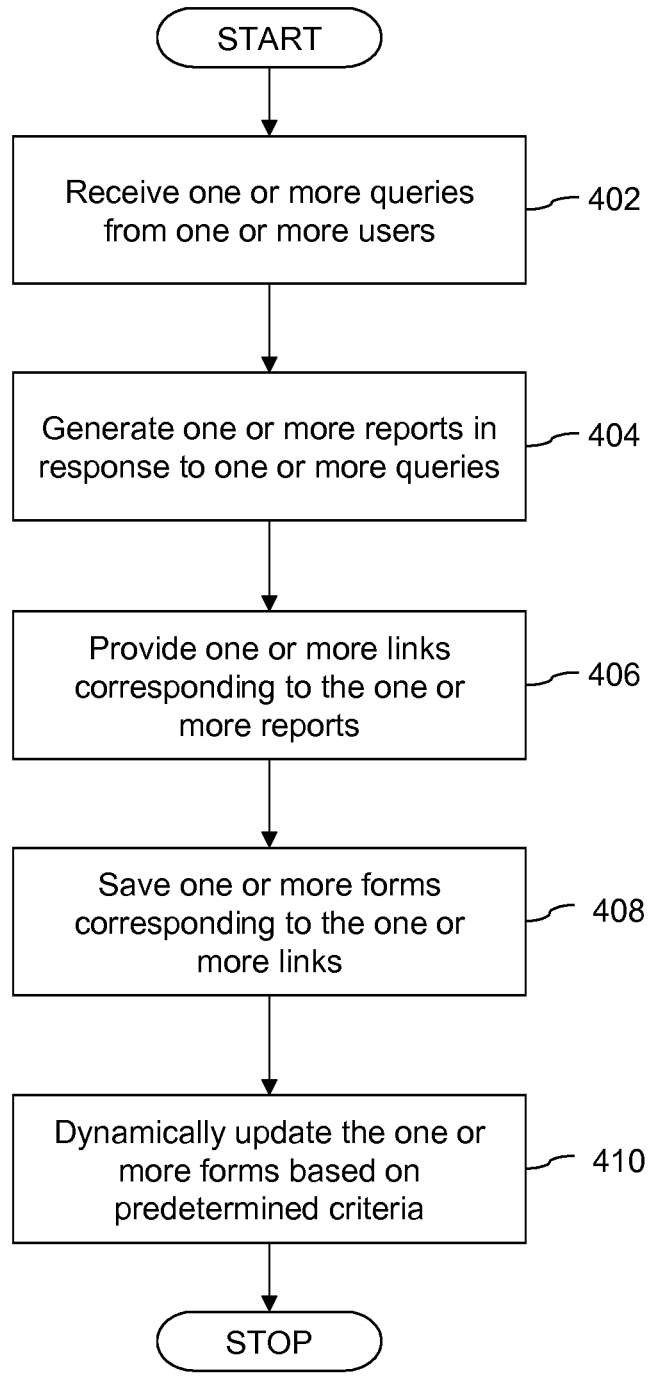
FIG. 4 is a flowchart illustrating a method for generating dynamic reports in accordance with an embodiment of the invention.

FIG. 4 is a flowchart illustrating a method for generating dynamic reports in accordance with an embodiment of the invention. At step 402, one or more queries are received from one or more devices, for example, one or more devices 102. The one or more queries are run on the business applications running on one or more users' devices. In an embodiment of the invention, before running the one or more queries, the one or more users may input their login details into the business applications. Thereafter at step 404, one or more reports are generated in response to the one or more queries.

At step 406, one or more links are provided along with the one or more reports. When the one or more users click on the one or more links the one or more forms corresponding to the one or more links are generated. The one or more forms include the details required for generating the one or more reports again and again. In an embodiment of the invention, the one or more forms are generated instantaneously and are dynamic in nature.

Thereafter, at step 408, the one or more forms are saved. One or more web addresses corresponding to the one or more forms and the one or more queries associated with the one or more reports are also saved. In an embodiment of the invention, one or more authentication details of the one or more users may be saved based on preferences of the one or more users. The one or more authentication details, which are saved, may then be used to generate dynamically updated reports by opening the one or more forms.

In an embodiment of the invention, the one or more addresses and the one or more queries may be saved in a separate support file dynamically. In another embodiment of the invention, the one or more addresses and the one or more queries may be embedded into the one or more forms.

In an embodiment of the invention, the one or more forms also provide an option to be saved in an off-line mode.

In an embodiment of the invention, the one or more forms may be merged based on preferences of the one or more users. For example, when the one or more forms are in spreadsheet format then one or more spreadsheets may be merged. One or more HTML pages may also be merged into one. The one or more users may also include charts, banners or headers in the one or more forms and format the output to suit any printing requirement.

In an embodiment of the invention, the one or more users may share the one or more forms with other users. The other users may then use the one or more forms to obtain the dynamically updated reports based on their access rights. In an embodiment of the invention, the one or more forms may be shared via email attachments.

At step 410, the one or more forms are dynamically updated based on predetermined criteria. In an embodiment of the invention, the predetermined criteria may include one or more requests, which are received from the one or more users for accessing the one or more forms. Upon receipt of the one or more requests the one or more forms are updated dynamically by fetching live data corresponding to the one or more queries from a server and the one or more users are provided with the dynamically updated reports. In another embodiment of the invention, the predetermined criteria may include certain time intervals at which the one or more forms may be updated dynamically. In yet another embodiment of the invention, the predetermined criteria for dynamically updating the one or more forms may include establishing communication between the one or more devices and the server. For example, each time the one or more devices are started with an access to internet or intranet or any other connection the one or more forms fetch live data from the server.

In an embodiment of the invention, the one or more users may also change any of default values that are saved in the one or more forms before accessing the one or more reports again. In another embodiment of the invention, the one or more forms may use an HTTP end point to provide the dynamically updated reports.

In an embodiment of the invention, the one or more forms in spreadsheet format may fetch data using a HTTP request. In another embodiment of the invention, the one or more forms in HTML format may access the data using Java script and XML.

The method described above is explained with the help of the following example. A user who is interested in books logins into an application using a device and runs a query, for example, a keyword based search, to obtain a list of books. A report including the list of books is then displayed along with a link in response to the query. When the user clicks on the link a form is generated by the application. This form is then saved on the user's device. In an embodiment of the invention, the form includes data associated with the report, address of a server, the query and the login details of the user. When the form is opened thereafter, the form is dynamically updated by using the query, the login details of the user, the data associated with the report and the address of the server. In an embodiment of the invention, the opening of the form provides dynamically updated report to the user. The form may be opened by the user or other users with whom the user shares the form. The user or other users may change the query when accessing the report again. Further, the user may also merge the form with any other form or make changes to the form.

It will be appreciated that preferences may be set up such that if a form is not accessed for a certain period of time the form may dynamically update itself at particular time intervals or whenever the device establishes a connection with the server.

The method described above includes different steps involved in generating updated reports in business applications. The method may include a greater or a fewer number of steps than those included in FIG. 4.

In an embodiment of the invention, the method described in FIG. 4 may be implemented using a computer program product. Examples of the computer program product include but are not limited to memory devices, tapes, disks, cassettes, integrated circuits, servers, online softwares, download links, installation links, and online links.

The one or more forms are dynamic in nature and hence, live data from the server is generated. Further, the one or more forms do not require installation of any other application on the one or more users' devices to facilitate generation of reports. Manual intervention is also minimized as the one or more users need not run the one or more queries again and again once the one or more forms are saved and opened next time.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

The invention claimed is:

1. A method comprising:
receiving one or more queries from a business application operating on a first client device;
retrieving query results from one or more server-side databases in response to the one or more queries;
generating one or more business reports for display on the first client device, wherein the one or more business reports are derived from the query results and are different from the query results;
providing, to the first client device, one or more links corresponding to the one or more business reports, wherein selecting the one or more links causes one or more forms to be generated at one or more servers;
receiving an input associated with the one or more links;
generating, at the one or more servers, the one or more forms in response to the input associated with the one or more links, wherein a first form in the one or more forms is comprised of:
a web address of at least one of the one or more server-side databases;
the one or more queries; and
details for repeatedly generating the one or more business reports;
storing the one or more forms at the one or more servers;
receiving, at the one or more servers, one or more requests for accessing the one or more forms, from a second client device;
in response to receiving the one or more requests, or in response to predetermined criteria, dynamically updating the one or more forms by fetching live data from the one or more server-side databases corresponding to the one or more queries; and
using the updated one or more forms to generate one or more updated business reports for display on the second client device.

2. The method of claim 1, wherein storing the one or more forms comprises saving one or more authentication details based on preferences of one or more users.

3. The method of claim 1, wherein storing the one or more forms comprises merging the one or more forms based on preferences of one or more users.

4. The method of claim 1 further comprising sharing the one or more forms based on preferences of one or more users.

5. A system comprising:
one or more processors; and
one or more storage devices coupled with the one or more processors, the one or more storage devices having sets of instructions stored thereon which, when executed by the one or more processors, cause the one or more processors to:
receive one or more queries from a business application operating on a first client device;
retrieve query results from one or more server-side databases in response to the one or more queries;
generate one or more business reports for display on the first client device, wherein the one or more business reports are derived from the query results and are different from the query results;
provide, to the first client device, one or more links corresponding to the one or more business reports, wherein selecting the one or more links causes one or more forms to be generated at one or more servers;

receive an input associated with the one or more links;

generate, at the one or more servers, the one or more forms in response to the input associated with the one or more links, wherein a first form in the one or more forms is comprised of:
- a web address of at least one of the one or more server-side databases;
- the one or more queries; and
- details for repeatedly generating the one or more business reports;

store the one or more forms at the one or more servers;

receive, at the one or more servers, one or more requests for accessing the one or more forms, from a second client device;

in response to receiving the one or more requests, or in response to predetermined criteria, dynamically update the one or more forms by fetching live data from the one or more server-side databases corresponding to the one or more queries; and use the updated one or more forms to generate one or more updated business reports for display on the second client device.

6. The system of claim 5, wherein the sets of instructions, when executed by the one or more processors, further cause the one or more processors to save one or more authentication details based on preferences of one or more users.

7. The system of claim 5, wherein the sets of instructions, when executed by the one or more processors, further cause the one or more processors to merge the one or more forms based on preferences of one or more users.

8. The system of claim 5, wherein the sets of instructions, when executed by the one or more processors, further cause the one or more processors to share the one or more forms based on preferences of one or more users.

9. One or more non-transitory computer readable mediums having sets of instructions stored thereon which, when executed by one or more computers, cause the one or more computers to:

receive one or more queries from a business application operating on a first client device;

retrieve query results from one or more server-side databases in response to the one or more queries;

generate one or more business reports for display on the first client device, wherein the one or more business reports are derived from the query results and are different from the query results;

provide, to the first client device, one or more links corresponding to the one or more business reports, wherein selecting the one or more links causes one or more forms to be generated at one or more servers;

receive an input associated with the one or more links;

generate, at the one or more servers, the one or more forms in response to the input associated with the one or more links, wherein a first form in the one or more forms is comprised of:
- a web address of at least one of the one or more server-side databases;
- the one or more queries; and
- details for repeatedly generating the one or more business reports;

store the one or more forms at the one or more servers;

receive, at the one or more servers, one or more requests for accessing the one or more forms, from a second client device;

in response to receiving the one or more requests, or in response to predetermined criteria, dynamically update the one or more forms by fetching live data from the one or more server-side databases corresponding to the one or more queries; and use the updated one or more forms to generate one or more updated business reports for display on the second client device.

10. The one or more non-transitory computer readable mediums of claim 9, wherein the sets of instructions further cause the one or more computers to save one or more authentication details based on preferences of one or more users.

11. The one or more non-transitory computer readable mediums of claim 9, wherein the sets of instructions further cause the one or more computers to merge the one or more forms based on preferences of one or more users.

12. The one or more non-transitory computer readable mediums of claim 9, wherein the sets of instructions further cause the one or more computers share the one or more forms based on preferences of one or more users.

* * * * *